United States Patent
Erez et al.

(10) Patent No.: US 10,489,072 B2
(45) Date of Patent: Nov. 26, 2019

(54) ACTIVITY BASED DEVICE INITIATED STATE TRANSITIONS

(71) Applicant: Western Digital Technologies, Inc., San Jose, CA (US)

(72) Inventors: Eran Erez, Bothell, WA (US); Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 143 days.

(21) Appl. No.: 15/800,148

(22) Filed: Nov. 1, 2017

(65) Prior Publication Data
US 2019/0129630 A1  May 2, 2019

(51) Int. Cl.
| | |
|---|---|
| G06F 3/06 | (2006.01) |
| G06F 1/3234 | (2019.01) |
| G06N 3/08 | (2006.01) |
| G06N 3/04 | (2006.01) |

(52) U.S. Cl.
CPC .......... *G06F 3/0625* (2013.01); *G06F 1/3268* (2013.01); *G06F 3/0653* (2013.01); *G06F 3/0673* (2013.01); *G06F 2003/0692* (2013.01); *G06F 2003/0697* (2013.01); *G06N 3/04* (2013.01); *G06N 3/08* (2013.01)

(58) Field of Classification Search
CPC .......... G06F 3/0625; G06F 1/3268; G06F 2003/0692; G06F 3/0634; G06F 3/0653; G06F 3/0673; G06N 3/04; G06N 3/08
See application file for complete search history.

(56) References Cited

U.S. PATENT DOCUMENTS

| | | |
|---|---|---|
| 9,110,677 B2 * | 8/2015 | Ravimohan .......... G06F 9/4401 |
| 9,514,837 B2 | 12/2016 | Shapira et al. |
| 2013/0166032 A1 | 6/2013 | McDonough et al. |
| 2015/0012671 A1 * | 1/2015 | Park ...................... G06F 1/3268 710/5 |
| 2015/0121106 A1 * | 4/2015 | Eckert .................... G06F 1/3228 713/323 |
| 2015/0142996 A1 | 5/2015 | Lu |
| 2015/0347012 A1 | 12/2015 | Dewitt et al. |
| 2016/0103481 A1 * | 4/2016 | Griffith ................. G06F 1/3296 713/323 |
| 2017/0024002 A1 * | 1/2017 | Tzafrir ................... G06F 1/3228 |

* cited by examiner

*Primary Examiner* — Terrell S Johnson
(74) *Attorney, Agent, or Firm* — Patterson & Sheridan, LLP; Steven H. Versteeg

(57) ABSTRACT

A controller of a storage device analyzes data comprising a plurality of previous host idle durations to identify a trend in the previous host idle duration. The controller projects a next host idle duration based on the trend. The controller determines a transition from a storage device active state to a next storage device sleep state or a transition from a storage device sleep state to a next storage device active state based on the projected host idle duration.

20 Claims, 9 Drawing Sheets
(2 of 9 Drawing Sheet(s) Filed in Color)

ACTIVITY BASED DEVICE INITIATED STATE TRANSITIONS

BACKGROUND INFORMATION

Field of the Disclosure

Aspects of the disclosure relate to computer memory storage devices. More specifically, aspects relate to optimizing power savings versus performance in memory storage devices by placing the storage device in a sleep state based on host idle duration.

Description of the Related Art

As central processing units (CPUs) continue to become faster, the memory units that supply the data to the CPUs need to continually become faster as well. In a typical computer system, a variety of different memory devices are employed to meet the needs of a particular application, wherein each memory device provides a trade-off in storage capacity, cost, power consumption, and response time. System performance is maximized by utilizing the devices in a hierarchy arrangement, utilizing both extremely fast, but low-capacity memory devices in combination with slower, higher capacity memory devices. The memory hierarchy would include both on-chip memory devices (e.g., processor registers, caches, etc.) as well as off-chip memory devices (e.g., main memory devices and disk storage). For example, a computer system comprising a host system may employ a hard disk drive (HDD) as the disk storage device and a dynamic random access memory (DRAM) as the main memory. The hard disk drive provides cheaper storage (i.e., cost/GB), and higher capacity, but slower response time. In contrast, the DRAM device provides faster response time, but at higher cost and lower capacity.

In recent years, non-volatile memory (NVM) devices in the form of solid-state drives (SSD) have been employed as a complementary type of storage, used either instead of or in conjunction with a HDD. The NVM devices provide faster response time than a typical HDD, but at a slightly higher cost per gigabyte (GB). Both are located "off-board", and therefore communicate with the CPU or host system via a data bus. As such, HDD and NVM devices are often referred to as an "Input/Output (I/O) Memory Tier", because they require input/output operations to communicate with the CPU (referred to herein as the host system).

A storage device, such as an HDD or an SSD, includes one or more processors, such as a central processing unit (CPU), that execute various tasks, such as receiving host commands, executing read and write operations to memory devices, performing maintenance operations (such as garbage collection or wear leveling), and the like. In some examples, the storage device may include multiple processors, such as a multi-core CPU, where each core effectively represents a different CPU. In a multiple processor environment, the storage device may perform multiple tasks simultaneously.

An HDD or SSD of a storage system may enter a low power state (sleep state) based on host idle duration or a host directive. The HDD or SSD typically exits the sleep state based on incoming host activity. When the HDD or the SSD exits the sleep state initiated by a host activity, the HDD or SSD sustains a performance "penalty" due to exit latency. Exit latency is the time it takes the HDD or SSD to make itself ready (e.g. power up circuits, load firmware, configure state machines etc.). This exit latency delays the HDD or SSD handling of the incoming host requests thereby sustaining negative user perceived responsiveness.

Low power transition timing is a tradeoff between responsiveness and power consumption. Previous attempts to optimize the tradeoff employ different idle duration settings over variety of workloads to determine an "optimum" value. This timeout is static and thus does not scale in real time to workload changes. Further, if sleep state entry is delayed for too long, power is wasted. If power is optimized and the sleep state is entered too early, then responsiveness is hurt by waiting the full exit latency upon incoming host activity.

Therefore, there is a need in the art for improved power consumption and device responsiveness.

SUMMARY

In some examples, a controller of a storage device analyzes data comprising a plurality of previous host idle durations to identify a trend in the previous host idle duration. The controller projects a next host idle duration based on the trend. The controller determines a transition from a storage device active state to a next storage device sleep state or a transition from a storage device sleep state to a next storage device active state based on the projected host idle duration.

In some examples, a controller of a storage device analyzes data comprising a plurality of previous host idle durations to determine a contour of the analyzed data. The controller projects a next host idle duration based on the contour. The controller determines a transition from a storage device active state to a next storage device sleep state or a transition from a storage device sleep state to a next storage device active state based on the projected host idle duration.

In some examples, a controller of a storage device analyzes data comprising a plurality of previous host idle durations to determine a slope of the analyzed data over the plurality of previous host idle durations. The controller determines a graph fitted to the data based on the slope of the analyzed data over the plurality of previous host idle durations. The controller projects a next host idle duration based on fitted graph. The controller determines a transition from a storage device active state to a next storage device sleep state or a transition from a storage device sleep state to a next storage device active state based on the projected host idle duration.

In some examples, a system for trading off power consumption versus responsiveness in a storage device controlled by a host comprises a host device or a controller of the storage device coupled to non-volatile memory and configured to: analyze data comprising a plurality of previous host idle durations to identify a trend in the previous host idle durations, project a next host idle duration based on the trend, and determine a transition from a storage device active state to a next storage device sleep state or a transition from a storage device sleep state to a next storage device active state based on the projected host idle duration.

In some examples, a system for trading off power consumption versus responsiveness in a storage device controlled by a host comprises: means for analyzing data comprising a plurality of previous host idle durations to determine a contour of the analyzed data, means for projecting a next host idle duration based on the contour, and means for determining a transition from a storage device active state to a next storage device sleep state or a transition from a storage device sleep state to a next storage device active state based on the projected host idle duration.

The details of one or more examples are set forth in the accompanying drawings and the description below. Other features, objects, and advantages will be apparent from the description and drawings, and from the claims.

BRIEF DESCRIPTION OF THE DRAWINGS

The patent or application file contains at least one drawing executed in color. Copies of this patent or patent application publication with color drawings will be provided by the Office upon request and payment of the necessary fee.

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim. Likewise, reference to "the disclosure" shall not be construed as a generalization of any inventive subject matter disclosed herein and shall not be considered to be an element or limitation of the appended claims except where explicitly recited in a claim.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

In general, this disclosure describes a controller of a storage device that analyzes data comprising a plurality of previous host idle durations to identify a trend in the previous host idle duration. The controller projects a next host idle duration based on the trend. The controller determines a transition from a storage device active state to a next storage device sleep state or a transition from a storage device sleep state to a next storage device active state based on the projected host idle duration.

In some examples, the controller postpones the transition from the active state to the next storage device sleep state based on the projected host idle duration. In another example, the controller expedites the transition from the active state to the next storage device sleep state based on the projected host idle duration.

Figure 1:
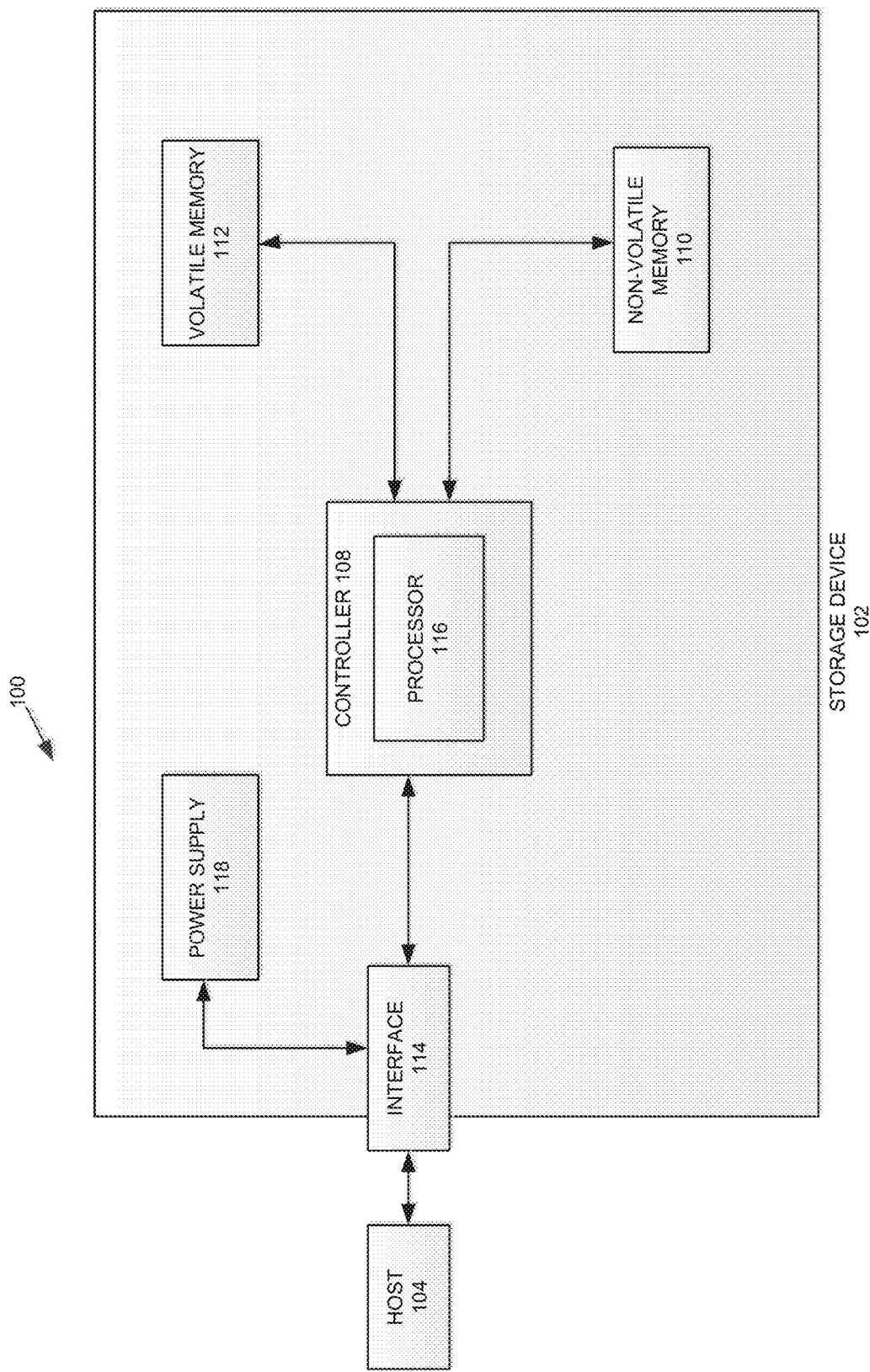
FIG. 1 is a conceptual and schematic block diagram illustrating an example storage environment in which storage device may function as a storage device for host device, in accordance with one or more techniques of this disclosure.

FIG. 1 is a conceptual and schematic block diagram illustrating an example storage environment 100 in which storage device 102 may function as a storage device for host device 104, in accordance with one or more techniques of this disclosure. For instance, host device 104 may utilize non-volatile memory devices included in storage device 102 to store and retrieve data. In some examples, storage environment 100 may include a plurality of storage devices, such as storage device 102, which may operate as a storage array. For instance, storage environment 100 may include a plurality of storages devices 102 configured as a redundant array of inexpensive/independent disks (RAID) that collectively function as a mass storage device for host device 104. Storage device 102 may be, for example, a solid state drive (SSD), a hard disk drive (HDD), a hybrid drive, which includes both solid state memory and magnetic media, or the like.

Storage environment 100 includes host device 104 which may store and/or retrieve data to and/or from one or more storage devices, such as storage device 102. As illustrated in FIG. 1, host device 104 communicates with storage device 102 via interface 114. Host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, and the like. Typically, host device 104 comprises any device having a processor, which may refer to any form of hardware capable of processing data and may include a general purpose processing unit, such as a central processing unit (CPU), dedicated hardware (such as an application specific integrated circuit (ASIC)), configurable hardware such as a field programmable gate array (FPGA) or any other form of processing unit configured by way of software instructions, microcode, firmware or the like.

As illustrated in FIG. 1, the storage device 102 includes a controller 108, non-volatile memory 110 (NVM 110), power supply 118, volatile memory 112, and an interface 114. In some examples, the storage device 102 may include additional components not shown in FIG. 1 for sake of clarity. For example, the storage device 102 may include a printed board (PB) to which components of the storage device 102 are mechanically attached and which includes electrically conductive traces that electrically interconnect components of storage device 102, or the like. In some examples, the physical dimensions and connector configurations of the storage device 102 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe x1, x4, x8, x16, PCIe Mini Card, MiniPCI, etc.). In some examples, storage device 102 may be directly coupled (e.g., directly soldered) to a motherboard of host device the 104.

The storage device 102 may include the interface 114 for interfacing with the host device 104. The interface 114 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), PCI-express, or Non-Volatile Memory Express (NVMe). The electrical connection of the interface 114 (e.g., the data bus, the control bus, or both) is electrically connected to the controller 108, providing electrical connection between the host device 104 and the controller 108, allowing data to be exchanged between host device the 104 and controller the 108. In some examples, the electrical connection of the interface 114 may also permit the storage device 102 to receive power from the host device 104. For example, as illustrated in FIG. 1, the power supply 118 may receive power from host device the 104 via the interface 114.

The storage device 102 may include the power supply 118, which may provide power to one or more components of the storage device 102. When operating in a standard mode, the power supply 118 may provide power to the one or more components using power provided by an external device, such as the host device 104. For instance, the power supply 118 may provide power to the one or more components using power received from the host device 104 via the interface 114. In some examples, the power supply 118 may include one or more power storage components configured to provide power to the one or more components when operating in a shutdown mode, such as where power ceases to be received from the external device. In this way, the power supply 118 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 102 includes volatile memory 112, which may be used by the controller 108 to temporarily store information. In some examples, the controller 108 may use volatile memory 112 as a cache. For instance, the controller 108 may store cached information in volatile memory 112 until the cached information is written to NVM 110. Volatile memory 112 may consume power received from the power supply 118 to maintain the data stored in volatile memory 112. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

The storage device 102 includes the controller 108, which may manage one or more operations of the storage device 102. For instance, the controller 108 may manage the reading of data from and/or the writing of data to NVM 110 or volatile memory 112. In some examples, the controller 108 may manage the reading of data from and/or the writing of data to NVM 110 or volatile memory 112 by exchanging signals with NVM 110 or volatile memory 112. As discussed above, the controller 108 may exchange signals with NVM 110 or volatile memory 112 in accordance with a communication protocol.

The controller 108 includes one or more processors 116 (collectively, "processor 116"). The processor 116 may be configured to execute tasks. The tasks may be of different types, and, in some examples, each respective type of task may be stored in or associated with a respective task queue while waiting for execution by the processor 116. The different types of tasks may include, for example, front end tasks, which may include receiving and interpreting instructions received from the host device 104. Other types of tasks including caching; back-end tasks, which may include reading data from or writing data to NVM 110; housing-keeping, which may include garbage collection, wear leveling, TRIM, or the like; and system tasks. In some examples, the processor 116 may be referred to as a computer unit, a processing unit, a core, or a central processing unit (CPU).

In embodiments of the present disclosure, the controller 108 or the host device 104 ("hereinafter, the controller 108") attempts to reduce an SSD exit latency impact on responsiveness. The controller 108 optimizes for both power and responsiveness at the same time.

The controller 108 is configured to analyze data comprising a plurality of previous host idle durations to identify a trend in the previous host idle durations. The controller 108 is configured to project a next host idle duration based on the trend. The controller 108 is configured to determine a transition of the storage device 102 from a storage device active state to a next storage device sleep state or a transition from a storage device sleep state to a next storage device active state based on the projected host idle duration.

Figure 2A:
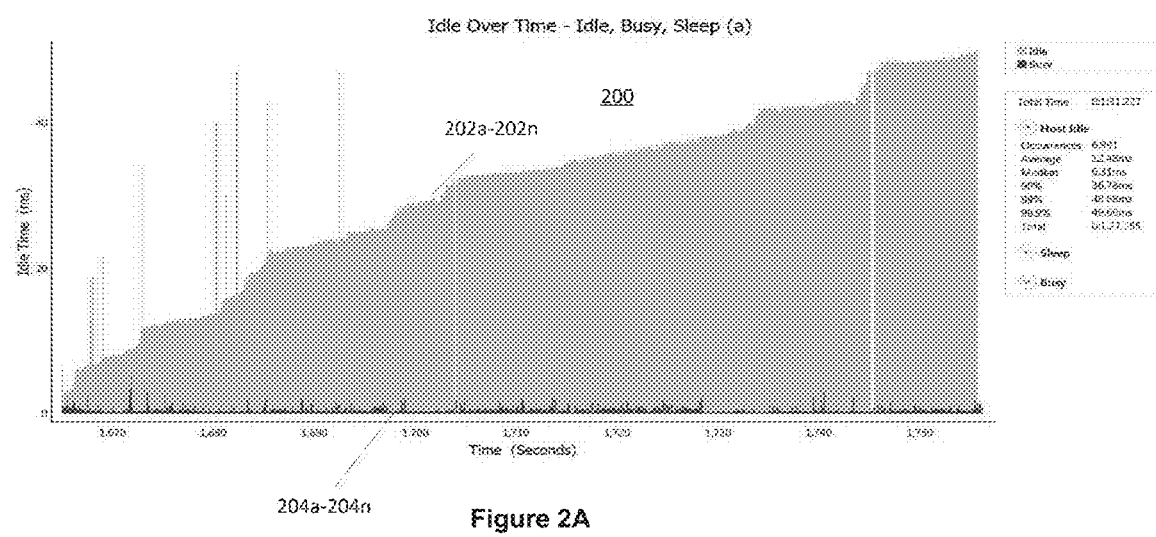
FIG. 2A shows a graph of data collected to plot host idle durations versus time elapsed superimposed on a graph of host activity time versus time elapsed.
Figure 2B:
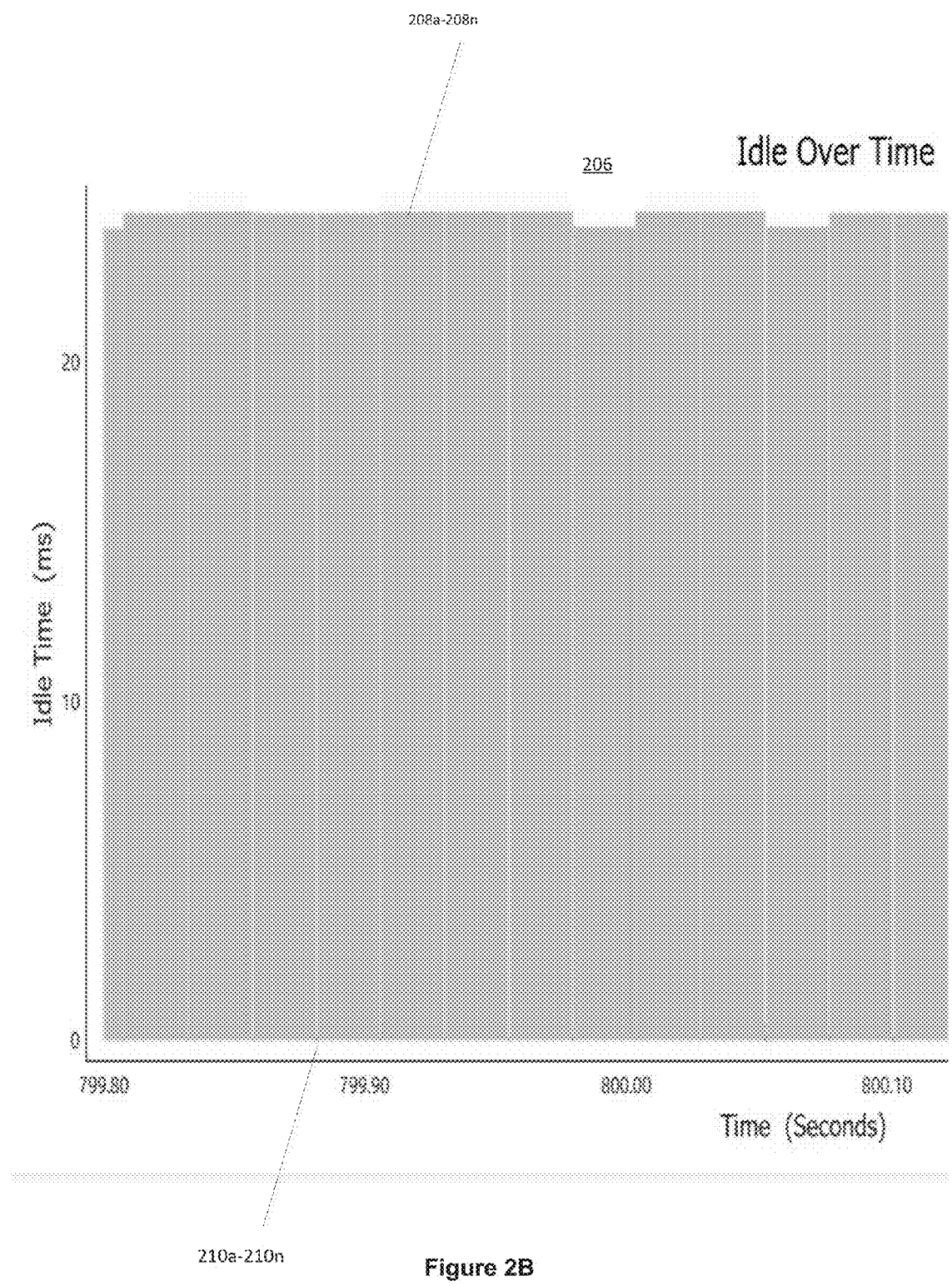
FIG. 2B shows an exploded view of the graphs of FIG. 2A.

FIGS. 2A and 2B show a graph 200, 206 of data collected to plot host idle durations versus time elapsed 202a-202n, 208a-208n superimposed on a graph 204a-204n, 210a-210n of host activity time versus time elapsed. The controller may be configured to track the "trend", "contour", or "slope" of the graph 200, 206 to provide a projection of a next host idle duration. A host activity may be, for example, executing read and write operations to memory devices. Based on one or more host idle duration points in the history in the data of the graph 200, 206, the controller 108 projects the next host idle duration. For example, the graph shows consecutive idle durations of 100 milliseconds, another at 100 milliseconds, then 110 milliseconds, then 99 milliseconds, and then 100 milliseconds. When the controller 108 determines that the last set of idle durations was in the range of 100 milliseconds plus or minus one millisecond, then the controller may project that the next idle duration may be 100 milliseconds. If the data trends along a contour or slope of 100 milliseconds, 102 milliseconds, 104 milliseconds, and 106 milliseconds, then the controller 108 may project that the host idle duration may be 108 milliseconds.

The controller 108 may derive a functional relationship between input elapsed time and idle duration according to fitting a curve to a contour of the data. In this way, a next idle duration may be derived from the fitted functional curve without relying on individual data points.

In one embodiment, the controller may postpone the transition of the storage device 102 from the active state to the next storage device sleep state based on the projected host idle duration. In this way, the activity window is kept for some extended duration based on projection. In another embodiment, the controller 108 may expedite the transition of the storage device 102 from the active state to the next storage device sleep state based on the projected host idle duration. The controller 108 causes the storage device 102 to enter the sleep state as soon as possible to save power. The controller 108 initiates a transition the storage device 102 into the active state just before an expected host activity, and stays in the active state for a period of time, accordingly opening the window for an incoming host activity. In still another embodiment, the controller 108, may transition the storage device 102 from the storage device sleep state to the next storage device active state in anticipation of a host activity based on projected host idle duration.

In an example, the active state duration lasts from the transition from the storage device sleep state to the next storage device active state at a first predetermined time before the projected next host activity time to a transition from the next storage device active state to a next storage device sleep state at a second predetermined time after the projected next host activity time. A duration of time between the first predetermined time and the second predetermined time is fixed or adapted based on the analysis.

In an example, the controller 108 places the storage device 102 in the sleep state after the second predetermined time has expired.

In one example, the controller 108 places the storage device 102 in the sleep state after the second predetermined amount of time has expired. Embodiments of the present disclosure are not limited to placing the storage device 102 in the sleep state after the next activity has elapsed. In another embodiment, the controller 108 of the storage device 102 enters the sleep state before the first predetermined time and after the second predetermined time. In another embodiment, the NVM 110 of the storage device 102 enters the sleep state before the first predetermined time and after the second predetermined time. In another embodiment, entering the sleep state may only apply to link layer state management in, e.g., NVMe transitioning from L1.2 (sleep) to L0 (active) link active state, while the remainder of the storage device 102 remains in active state, realizing power savings from the link layer only. In another example, entering the sleep state may be implemented by the host device 104. The host device 104 may estimate when the next application activity arrives and then begin waking up components—including the storage device 102—in expectation of sending activity down to the storage device 102.

Figure 3A:
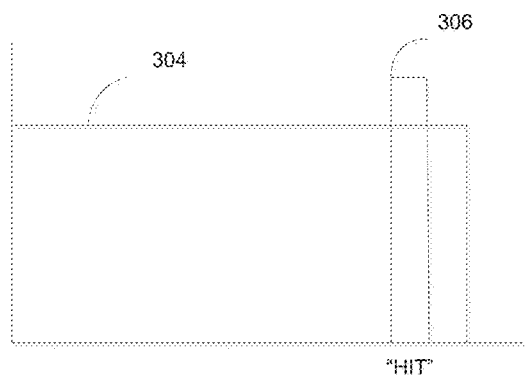
FIGS. 3A-3D illustrate samples of host activity timing "hits" and "misses."
Figure 3B:
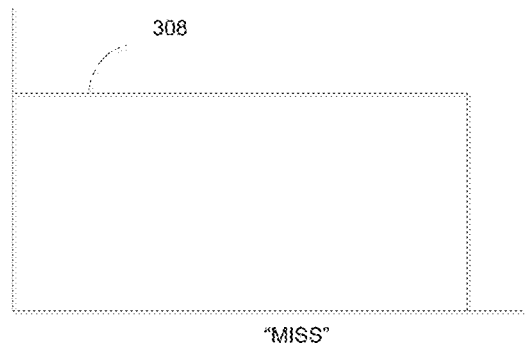
Figure 3C:
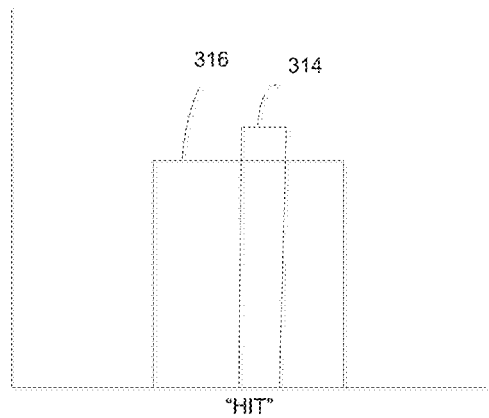
Figure 3D:
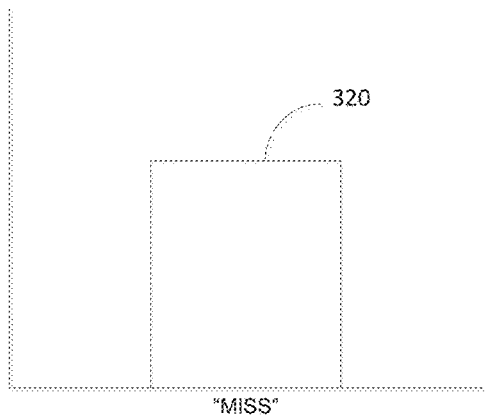

FIGS. 3A-3D illustrate samples of host activity timing "hits" and "misses." FIGS. 3A and 3B illustrate the embodiment wherein the controller 108 postpones the transition from active state to the sleep state if the controller projects a soon coming host activity. FIG. 3A shows a host activity projection time "hit", while FIG. 3B shows a host activity projection time "miss". FIGS. 3C and 3D illustrate the embodiment wherein the controller 108 causes the storage device 102 to enter the sleep state as soon as possible to save power. FIG. 3C shows a host activity projection time "hit", while FIG. 3D shows a host activity projection time "miss". In case of host activity timing projection "hit" (e.g., host activity 306, 314 arrives when the window 304, 316 is open), when the host activity 306, 314 arrives, the storage device 102 is instantly responsive in an active state. In case of host activity timing projection "miss" (e.g., host activity not arriving inside the window 308, 320, respectively), the next host activity may arrive much later than projected. To prevent power wastage in the case of a host activity timing projection miss, the storage device 102 may transition back to sleep state, closing the window.

While FIGS. 3A and 3B illustrate a single "window" example, the controller 108 may be configured to consider multiple such windows. In one example, the host device 104 runs multiple applications and each application has a different projected idle duration. For example, the host device 104 may run a virus-scan with 200 ms idle duration and a backup application with idle duration of 300 ms. In such circumstances, the controller 108 may be configured to project multiple idle durations. For example, the controller 108 may transition to active state at 190 ms and transition back to sleep state at 205 ms, opening a first window for servicing the virus-scan. Then the controller 108 transitions to active state at 290 ms, opening a second window in preparation for servicing the backup application. Further, the length of the window might be fixed or adapted based on history and configuration.

Figure 4:
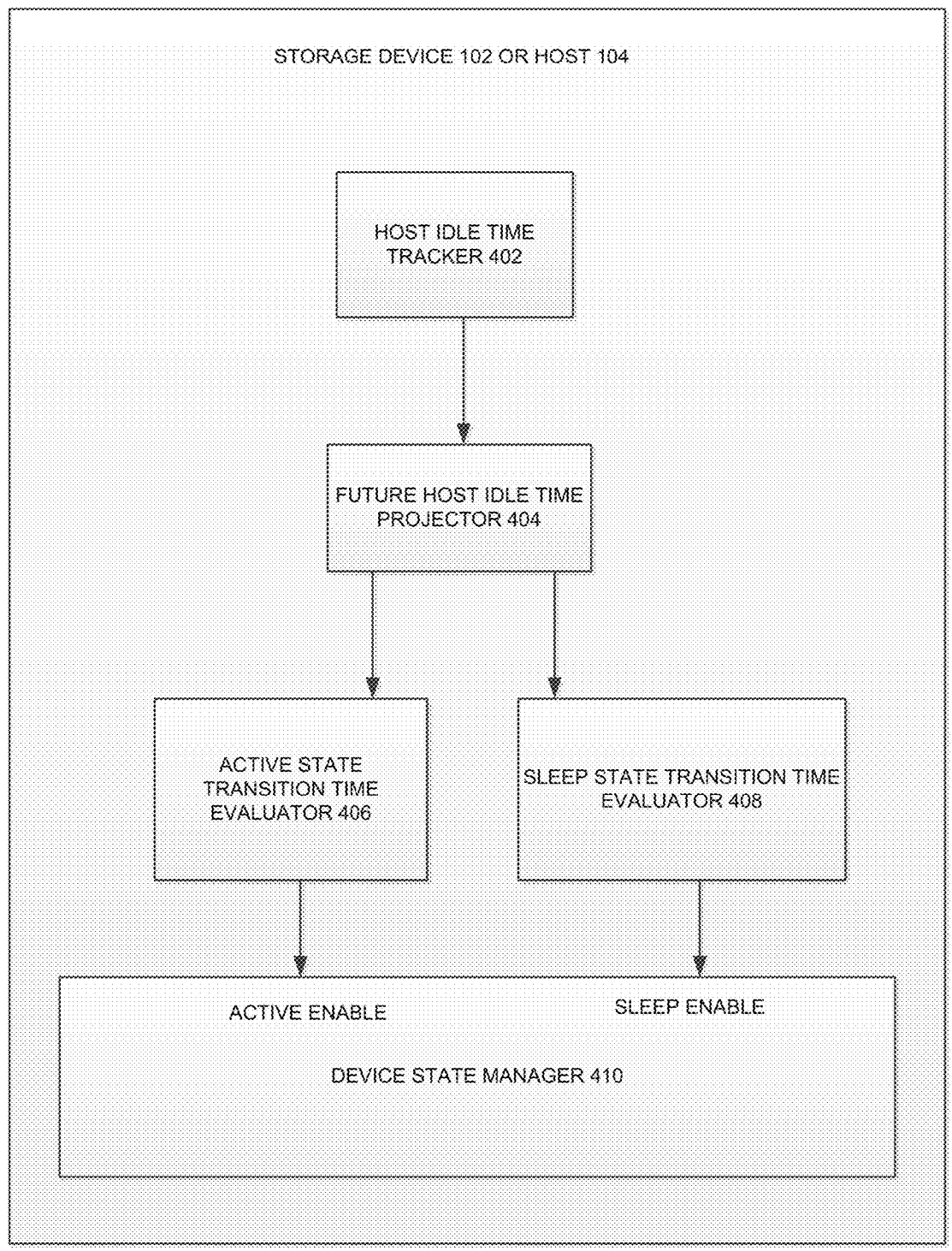
FIG. 4 shows components or modules of functionality contained in the controller.

FIG. 4 shows components or modules of functionality contained in the controller 108. The functionality may be implemented in any combination of hardware, firmware, or software. A host idle duration tracker 402 measures and keeps track of past host idle duration. A future host idle duration projector 404 projects a next host idle duration based on statistics gathered by the host idle duration tracker 406. An active state transition time evaluator 406 decides when (relative to the beginning of host idle) a transition to active state may be initiated. A sleep state transition time evaluator 408 decides when (relative to the beginning of host idle duration) a transition to a sleep active state may be initiated when no host activity has arrived since the transition to active state. A device state manager 410 triggers active and sleep active state transitions based on the timing information determined by the active state transition time evaluator 406 and the sleep state transition time evaluator.

Figure 5:
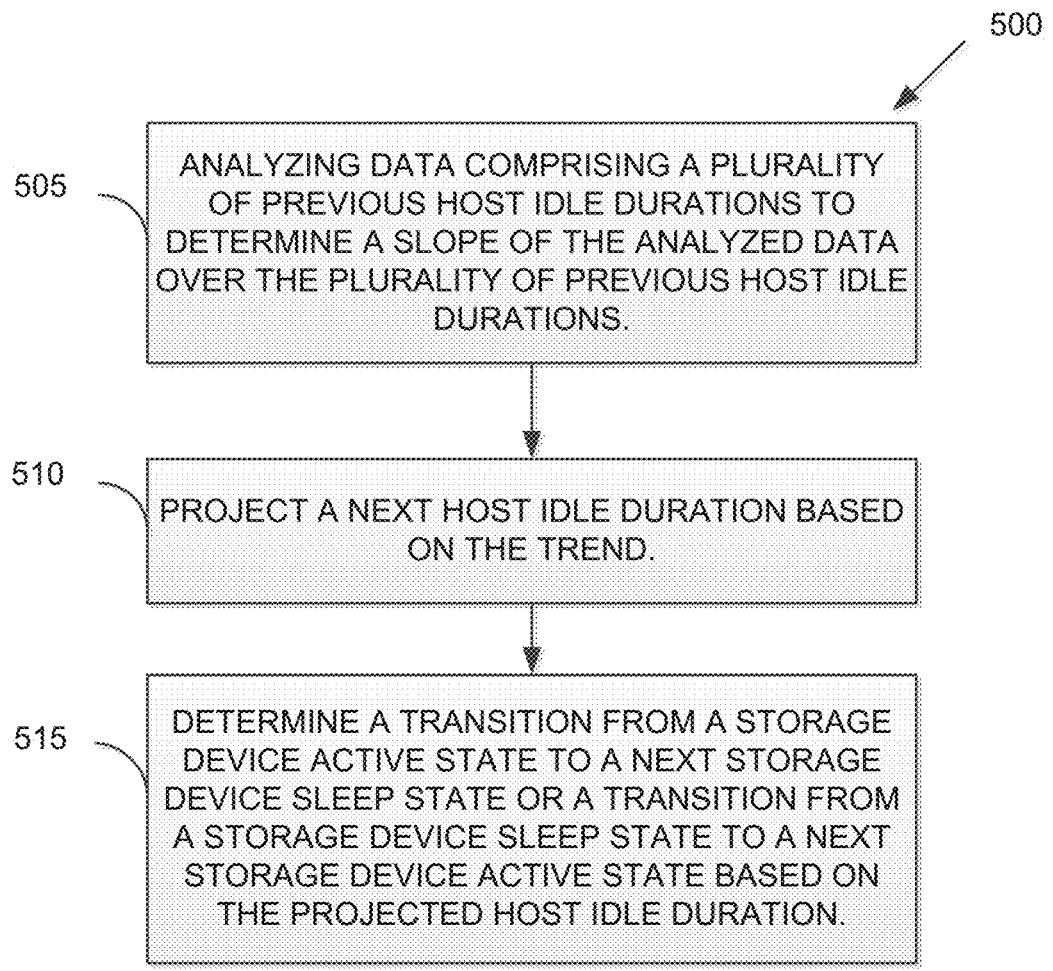
FIG. 5 is a flow diagram illustrating an example technique for placing a storage device in a sleep state based on host idle duration.

FIG. 5 is a flow diagram 500 illustrating an example technique for placing a storage device in a sleep state based on host idle duration. For ease of illustration, the technique of FIG. 5 will be described with concurrent reference to storage device 102 of FIG. 1. However, the techniques may be used with any combination of hardware or software.

At block 505, the host idle duration tracker 402 of the controller 108 analyzes data comprising a plurality of previous host idle durations to identify a trend in the previous host idle durations. At block 510, the future host idle duration projector 404 of the controller 108 projects a next host idle duration based on the trend. In an embodiment, the future host idle duration projector 404 of the controller 108 projects an occurrence of a next host activity based on the projected host idle duration. At block 515, the active state transition time evaluator 406 of the controller 108 determines a transition of the storage device 102 from a storage device active state to a next storage device sleep state or a transition from a storage device sleep state to a next storage device active state based on the projected host idle duration.

In one embodiment, the device state manager 410 of the controller 108, working in conjunction with the active state transition time evaluator 406 and the sleep state transition time evaluator 408, may postpone the transition of the storage device 102 from the active state to the next storage device sleep state based on the projected host idle duration. In another embodiment, the device state manager 410 of the controller 108, working in conjunction with the active state transition time evaluator 406 and the sleep state transition time evaluator 408, may expedite the transition of the storage device 102 from the active state to the next storage device sleep state based on the projected host idle duration. In still another embodiment, the device state manager 410 of the controller 108, working in conjunction with the active state transition time evaluator 406 and the sleep state transition time evaluator 408, may transition the storage device 102 from the storage device sleep state to the next storage device active state in anticipation of a host activity based on projected host idle duration.

In an example, the active state duration lasts from the transition from the storage device sleep state to the next storage device active state at a first predetermined time before the projected next host activity time to a transition from the next storage device active state to a next storage device sleep state at a second predetermined time after the projected next host activity time. A duration of time between the first predetermined time and the second predetermined time is fixed or adapted based on the analysis.

In an example, the sleep state transition time evaluator 408 places the storage device 102 in the sleep state after the second predetermined time has expired.

In an example, the controller 108 of the storage device 102 enters the sleep state before the first predetermined time and after the second predetermined time. In another example, the NVM devices 110 of the storage device 102 enter the sleep state before the first predetermined time and after the second predetermined time.

In one example, the controller 108 of the storage device 102 may execute the method 500. In another example, the host device 104 may execute the method 500.

In another embodiment, the method 500 may be performed for a number of different host activities. In another embodiment, the next host activity time may be based on the type of host activity. The length of the window may be fixed or adapted based on the analysis.

Figure 6:
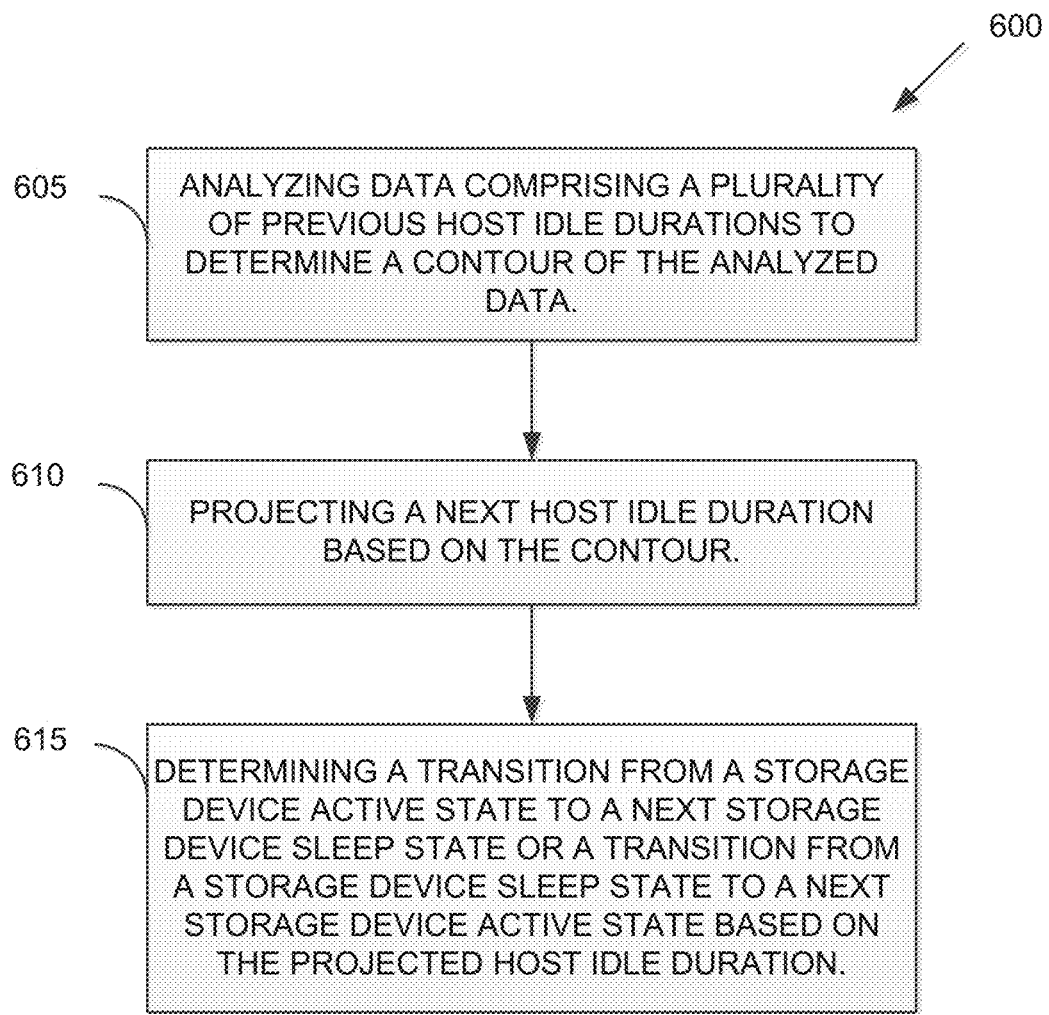
FIG. 6 is a flow diagram illustrating another example technique for placing a storage device in a sleep state based on host idle duration.

FIG. 6 is a flow diagram 600 illustrating another example technique for placing a storage device in a sleep state based on host idle duration. For ease of illustration, the technique of FIG. 6 will be described with concurrent reference to storage device 102 of FIG. 1. However, the techniques may be used with any combination of hardware or software.

At block 605, the host idle duration tracker 402 of the controller 108 analyzes data comprising a plurality of previous host idle durations to determine a contour of the analyzed data. At block 610, the future host idle duration projector 404 of the controller 108 projects a next host idle duration based on the contour. At block 615, the future host idle duration projector 404 determines a transition from a storage device active state to a next storage device sleep state or a transition from a storage device sleep state to a next storage device active state based on the projected host idle duration.

Figure 7:
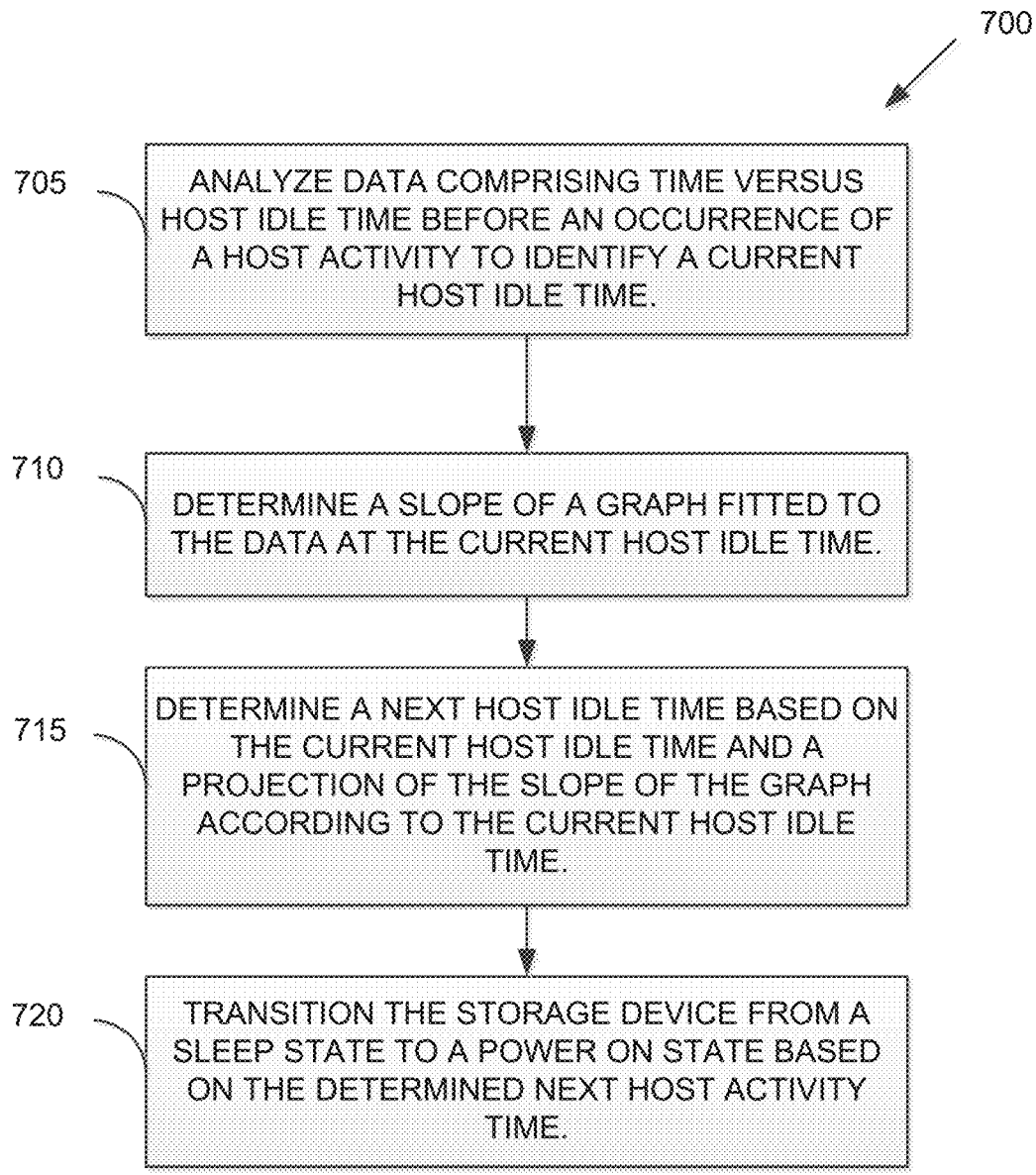
FIG. 7 is a flow diagram illustrating another example technique for placing a storage device in a sleep state based on host idle duration.

FIG. 7 is a flow diagram 700 illustrating another example technique for placing a storage device in a sleep state based on host idle duration. For ease of illustration, the technique of FIG. 7 will be described with concurrent reference to storage device 102 of FIG. 1. However, the techniques may be used with any combination of hardware or software.

At block 705, the host idle duration tracker 402 of the controller 108 analyzes data comprising a plurality of previous host idle durations to determine a slope of the analyzed data over the plurality of previous host idle durations. At block 710, the future host idle duration projector 404 of the controller 108 determines a graph fitted to the data based on the slope of the analyzed data over the plurality of previous host idle durations. At block 715, the future host idle duration projector 404 projecting a next host idle duration based on fitted graph. At block 720, the active state transition time evaluator 406 of the controller 108 determining a transition from a storage device active state to a next storage device sleep state or a transition from a storage device sleep state to a next storage device active state based on the projected host idle duration.

Figure 8:
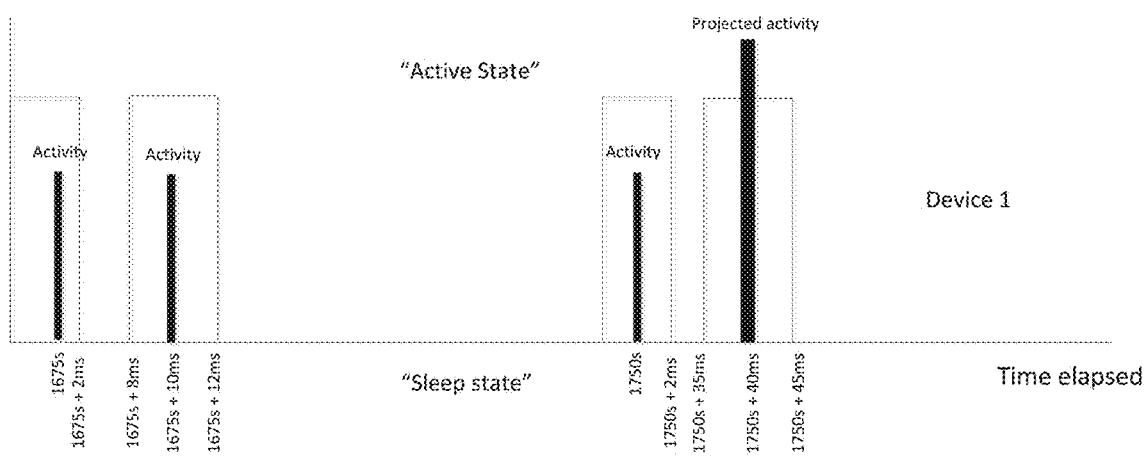
FIG. 8 show a hypothetical example of placing a storage device in various states of activity based on host idle duration and employing the graph of data of FIG. 2.

FIG. 8 show a hypothetical example of placing a storage device in various state of activity based on host idle duration and employing the graph of data of FIG. 2. At time elapsed t=1675 s, a host request has completed and host idle time has started. The graph of FIG. 2 indicates a projected idle duration of 10 ms. Therefore, device one projects that a host activity may arrive at time t=1675 s+10 ms. At time t=1675 s+2 ms device one enters a sleep state to save power. At time t=1675 s+8 ms, device one transitions to an active state in an expectation of a soon-to-arrive host activity. The host activity arrives as expected at time t=1675 s+10 ms.

At time elapsed t=1750 s, a host request has completed and host idle time has started. The graph of FIG. 2 indicates a projected idle duration of 40 ms. Therefore, device one projects that a host activity may arrive at time t=1750 s+40 ms. At time t=1750 s+2 ms, device enters the sleep state to save power. At time t=1750 s+35 ms, device one transitions to the active state in an expectation of a host activity arriving shortly. In this example, a host activity did not arrive at the projected time. Device one waits for another 5 ms after the projected activity, until time t=1750 s+45 ms. Since no host activity arrives, device one transitions back to sleep state at time t=1740 s+45 ms.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

While the foregoing is directed to embodiments of the present disclosure, other and further embodiments of the disclosure may be devised without departing from the basic scope thereof, and the scope thereof is determined by the claims that follow.

What is claimed is:

1. A method for trading off power consumptions versus responsiveness in a storage device controlled by a host, comprising:
    analyzing data comprising a plurality of previous host idle durations to identify a trend based on a graph of the previous host idle durations;
    projecting a next host idle duration based on the trend; and
    determining a transition from a storage device active state to a next storage device sleep state or a transition from a storage device sleep state to a next storage device active state based on the projected host idle duration.

2. The method of claim 1, further comprising postponing the transition from the active state to the next storage device sleep state based on the projected host idle duration.

3. The method of claim 1, further comprising expediting the transition from the active state to the next storage device sleep state based on the projected host idle duration.

4. The method of claim 1, further comprising transitioning from the storage device sleep state to the next storage device active state in anticipation of a host activity based on projected host idle duration.

5. The method of claim 1, further comprising projecting an occurrence of a next host activity based on the projected host idle duration.

6. The method of claim 1, wherein said analyzing, projecting, and determining are performed for a number of different host activities.

7. The method of claim 1, wherein the determining is based on the type of host activity.

8. A method for trading off power consumptions versus responsiveness in a storage device controlled by a host, comprising:
    analyzing data comprising a plurality of previous host idle durations to identify a trend in the previous host idle durations;
    projecting a next host idle duration based on the trend;
    determining a transition from a storage device active state to a next storage device sleep state or a transition from a storage device sleep state to a next storage device active state based on the projected host idle duration; and
    projecting an occurrence of a next host activity based on the projected host idle duration, wherein the active state duration lasts from the transition from the storage device sleep state to the next storage device active state at a first predetermined time before the projected next host activity time to a transition from the next storage device active state to a next storage device sleep state at a second predetermined time after the projected next host activity time.

9. The method of claim 8, further comprising placing the storage device in the sleep state after the second predetermined time has expired.

10. The method of claim 8, wherein a duration of time between the first predetermined time and the second predetermined time is fixed or adapted based on the analysis.

11. A system for trading off power consumptions versus responsiveness in a storage device controlled by a host, comprising:
    a host device or a controller of the storage device coupled to non-volatile memory and configured to:
    analyze data comprising a plurality of previous host idle durations to identify a trend based on a graph of the previous host idle durations;
    project a next host idle duration based on the trend; and
    determine a transition from a storage device active state to a next storage device sleep state or a transition from a storage device sleep state to a next storage device active state based on the projected host idle duration.

12. The system of claim 11, wherein said analyzing, projecting, and, determining are directed by a controller of the storage device.

13. The system of claim 11, wherein said analyzing, projecting, and, determining are directed by the host.

14. The system of claim 11, wherein the storage device is a solid state drive (SSD), a hard disk drive (HDD), or a hybrid solid state/hard disk drive.

15. A system for trading off power consumptions versus responsiveness in a storage device controlled by a host, comprising:
    means for analyzing data comprising a plurality of previous host idle durations to identify a trend based on a graph of the previous host idle durations;
    means for projecting a next host idle duration based on the trend; and
    means for determining a transition from a storage device active state to a next storage device sleep state or a transition from a storage device sleep state to a next storage device active state based on the projected host idle duration.

16. The system of claim 15, wherein said analyzing, projecting, and, determining are directed by the host.

17. A method for trading off power consumptions versus responsiveness in a storage device controlled by a host, comprising:
- analyzing data comprising a plurality of previous host idle durations to determine a contour of the analyzed data;
- projecting a next host idle duration based on the contour; and
- determining a transition from a storage device active state to a next storage device sleep state or a transition from a storage device sleep state to a next storage device active state based on the projected host idle duration.

18. The method of claim 17, wherein said analyzing, projecting, and, determining are directed by the host.

19. A method for trading off power consumptions versus responsiveness in a storage device controlled by a host, comprising:
- analyzing data comprising a plurality of previous host idle durations to determine a slope of the analyzed data over the plurality of previous host idle durations;
- determining a graph fitted to the data based on the slope of the analyzed data over the plurality of previous host idle durations;
- projecting a next host idle duration based on fitted graph; and
- determining a transition from a storage device active state to a next storage device sleep state or a transition from a storage device sleep state to a next storage device active state based on the projected host idle duration.

20. The method of claim 19, wherein said analyzing, determining a graph, projecting, and determining a transition are directed by the host.

\* \* \* \* \*